(12) United States Patent  (10) Patent No.: US 9,344,417 B2
Mehtälä et al.  (45) Date of Patent: May 17, 2016

(54) AUTHENTICATION METHOD AND SYSTEM (75) Inventors: Markku Mehtälä, Oulu (FI); Teemu Mikkonen, Oulu (FI); Janne-Petteri Parkkila, Oulu (FI); Harri Salminen, Oulu (FI)

(73) Assignee: MEONTRUST INC., Oulu (FI)

( * ) Notice: Subject to any disclaimer, the term of this patent is extended or adjusted under 35 U.S.C. 154(b) by 0 days.

(21) Appl. No.: 14/007,742

(22) PCT Filed: Mar. 30, 2012

(86) PCT No.: PCT/FI2012/050328
§ 371 (c)(1),
(2), (4) Date: Sep. 26, 2013

(87) PCT Pub. No.: WO2012/131172
PCT Pub. Date: Oct. 4, 2012

(65) Prior Publication Data
US 2014/0019757 A1    Jan. 16, 2014

(30) Foreign Application Priority Data
Mar. 31, 2011 (FI) .................................... 20115313

(51) Int. Cl.
*G06F 21/33* (2013.01)
*H04L 29/06* (2006.01)
(Continued)

(52) U.S. Cl.
CPC ............... *H04L 63/08* (2013.01); *G06F 21/33* (2013.01); *H04L 9/321* (2013.01); *H04L 9/3226* (2013.01); *H04L 9/3234* (2013.01); *H04L 63/0838* (2013.01); *H04W 12/06* (2013.01)

(58) Field of Classification Search
CPC .................... H04L 63/0853; H04L 63/0838
See application file for complete search history.

(56) References Cited

U.S. PATENT DOCUMENTS 7,613,919 B2   11/2009 Bagley
2003/0050081 A1   3/2003 Huber
(Continued)

FOREIGN PATENT DOCUMENTS

EP    1871065 A1   12/2007
WO    03063528 A2   7/2003
(Continued)

OTHER PUBLICATIONS

Search Report for International Patent Application No. PCT/FI2012/050328; Jul. 13, 2012.
(Continued)

*Primary Examiner* — Eleni Shiferaw
*Assistant Examiner* — Alexander Lapian
(74) *Attorney, Agent, or Firm* — Barnes & Thornburg LLP (57) ABSTRACT An authenticating method including establishing trust between an authentication provider and service provider; establishing trust between the authentication provider and authentication application installed in a terminal. The authentication provider, for each session, receives an access code request and connection information from the terminal; generates and stores the access code; sends the access code to the terminal; receives the access code from the authentication application; indicates verification of the access code to the authentication application and terminal; receives from the authentication application a request to grant access to the terminal; instructs the service provider to grant access; and sends a confirmation of the granted access to the terminal. An authenticated session between the terminal and the service provider is setup for providing services to the terminal.

39 Claims, 6 Drawing Sheets (51) Int. Cl.
*H04W 12/06* (2009.01)
*H04L 9/32* (2006.01)

(56) References Cited

U.S. PATENT DOCUMENTS

| | | |
|---|---|---|
| 2003/0204726 A1 | 10/2003 | Kefford et al. |
| 2006/0048212 A1* | 3/2006 | Tsuruoka et al. .................. 726/4 |
| 2006/0080545 A1* | 4/2006 | Bagley .......................... 713/183 |
| 2009/0049521 A1 | 2/2009 | Le Rouzic et al. |
| 2009/0119754 A1* | 5/2009 | Schubert .......................... 726/4 |
| 2009/0172402 A1 | 7/2009 | Tran |
| 2011/0023099 A1* | 1/2011 | Kim et al. ........................ 726/5 |

FOREIGN PATENT DOCUMENTS

| | | |
|---|---|---|
| WO | 2006079145 A1 | 8/2006 |
| WO | 2007/089179 A1 | 8/2007 |
| WO | 2008001338 A2 | 1/2008 |
| WO | 2009123411 A1 | 10/2009 |

OTHER PUBLICATIONS

International Preliminary Report on Patentability for International Patent Application No. PCT/FI2012/050328; Jun. 3, 2013.
Supplementary European Search Report for European Patent No. 12764741 dated Feb. 24, 2015.

* cited by examiner

AUTHENTICATION METHOD AND SYSTEM

PRIORITY CLAIM

This patent application is a U.S. National Phase of International Patent Application No. PCT/FI2012/050328, filed 30 Mar. 2012, which claims priority to Finnish Patent Application No. 20115313, filed 31 Mar. 2011, the disclosures of which are incorporated herein by reference in their entirety.

FIELD OF THE INVENTION

The present invention relates to techniques, including methods, equipment and software, for centralized authentication.

As used herein, centralized authentication means a system and a process of authenticating a user to a service using an autonomous authentication provider entity which reliably identifies the user's mobile device and the user identifier associated with the device.

BACKGROUND OF THE INVENTION

U.S. Pat. No. 7,613,919 discloses systems, computer program products and methods for authentication using a one-time password. In a system that includes a client, a service provider, and an authentication service, the authentication service generates an authentication service identifier for the client. Any suitable identifier may be used for the authentication service identifier, which generally takes the form of an arbitrary number of characters. From the client, the authentication service receives a client moniker, such as a username for the client to use when accessing the authentication service. The authentication service sends a one-time password to the client for the client to use in accessing the service provider. When the authentication service receives a one-time password from the service provider, the authentication service sends the authentication service identifier for the client to the service provider to authenticate the client if the one-time password received from the service provider matches the one-time password sent to the client.

U.S. Pat. No. 7,613,919 is thus one example of documents that disclose techniques for enhancing conventional username/password-based authentication schemes with one-time passwords ("OTP"). A problem with such techniques disclosed is that the use of the username and a long-term password is required. This is a problem for the users who must manage and remember combinations of usernames and passwords, which should be different for each and every service or service provider accessed by the user. This is also a problem for the service providers who have to ensure that the usernames are unique within the user community. Yet another problem associated with the technology of U.S. Pat. No. 7,613,919 is that it burdens the service providers with authentication tasks. In other words, each service provider must address authentication issues separately. Similarly, EP 1871065 discloses a technique wherein the task of authenticating users is performed by the service provider itself.

It is an object of the present invention to alleviate at least one of the problems identified above.

SUMMARY OF THE INVENTION

The object of the invention is achieved by a method, apparatus and computer program product as defined in the attached independent claims. The dependent claims as well as the present patent specification and drawings provide specific embodiments which provide additional features and/or solve additional problems.

An aspect of the invention is an authentication method according to claim 1. Another aspect of the invention is an apparatus (authentication provider) specifically adapted to carry out the inventive method. Yet another aspect of the invention is an authentication program product whose execution in the authentication provider apparatus causes the apparatus to carry out the inventive method.

The inventive method for authenticating a user terminal comprises preparatory acts which will remain effective over several sessions, such as establishing a trust relationship between an authentication provider and at least one service provider. Benefits of the invention are utilized most effectively in cases wherein one authentication provider is shared among several service providers. The preparatory acts also comprise establishing a trust relationship between the authentication provider and at least one authentication application installed in a terminal accessible to a user of the user terminal.

The method further comprises performing the following acts by an authentication provider for each authenticated session between the user terminal and the at least one service provider:

receiving a request for an access code from the user terminal, along with connection information of the user terminal;

generating the requested access code and storing the generated access code and the connection information of the user terminal;

sending the generated access code to the user terminal;

optionally, receiving one or more first poll messages from the user terminal, each first poll message requesting a result of access code verification by the authentication provider;

receiving the access code from the authentication application trusted and known by the authentication provider;

indicating a positive verification of the access code to the authentication application;

indicating a positive verification of the access code to the user terminal;

optionally, receiving one or more second poll messages from the user terminal, each second poll message requesting confirmation of granted access, wherein the access relates to a set of services provided to the user terminal by the service provider;

receiving, from the authentication application, a request to grant access to the user terminal;

instructing the service provider to grant the requested access to the user terminal;

sending a confirmation of the granted access to the user terminal.

As a result, an authenticated session between the user terminal and the at least one service provider can set up for providing the set of services to the user terminal.

The term "user terminal" means any terminal by which services can be accessed over a wide-area network. A prime example is a personal computer with an internet browser, but as is well known, services can be remotely accessed by utilizing a wide range of terminals, including but not limited to laptop and palmtop computers, tablet computers, smart phones, home entertainment devices or the like. The element "terminal accessible to a user of the user terminal" is used to execute an authentication application trusted by the inventive authentication provider. Accordingly, the "terminal accessible to a user of the user terminal" is most conveniently, but non-restrictively, implemented as a mobile terminal provided with user authentication means. A mobile telephone or data terminal that requests the user to enter a PIN code serves as an illustrative example. These two terminals utilized by the user may be two distinct pieces of equipment or two separate functionalities provided by one piece of equipment. An example of the former implementation is a combination of a personal computer plus mobile telephone. An example of the latter implementation is a smart phone that implements a PIN-secured mobile telephone and an internet browser in a single piece of equipment. In the interest of clarity, the terms "user terminal" and "mobile terminal" will be used later in this document, but those skilled in the art will realize that both functionalities may be provided by a single piece of equipment.

The above definition of the invention comprises two optional steps which, strictly speaking, are not absolutely necessary. In an alternative implementation, the authentication provider may spontaneously send push notification messages to the user terminal. In such implementations the user terminal does not have to send the poll messages to the authentication provider.

DETAILED DESCRIPTION OF SPECIFIC EMBODIMENTS

Figure 1:
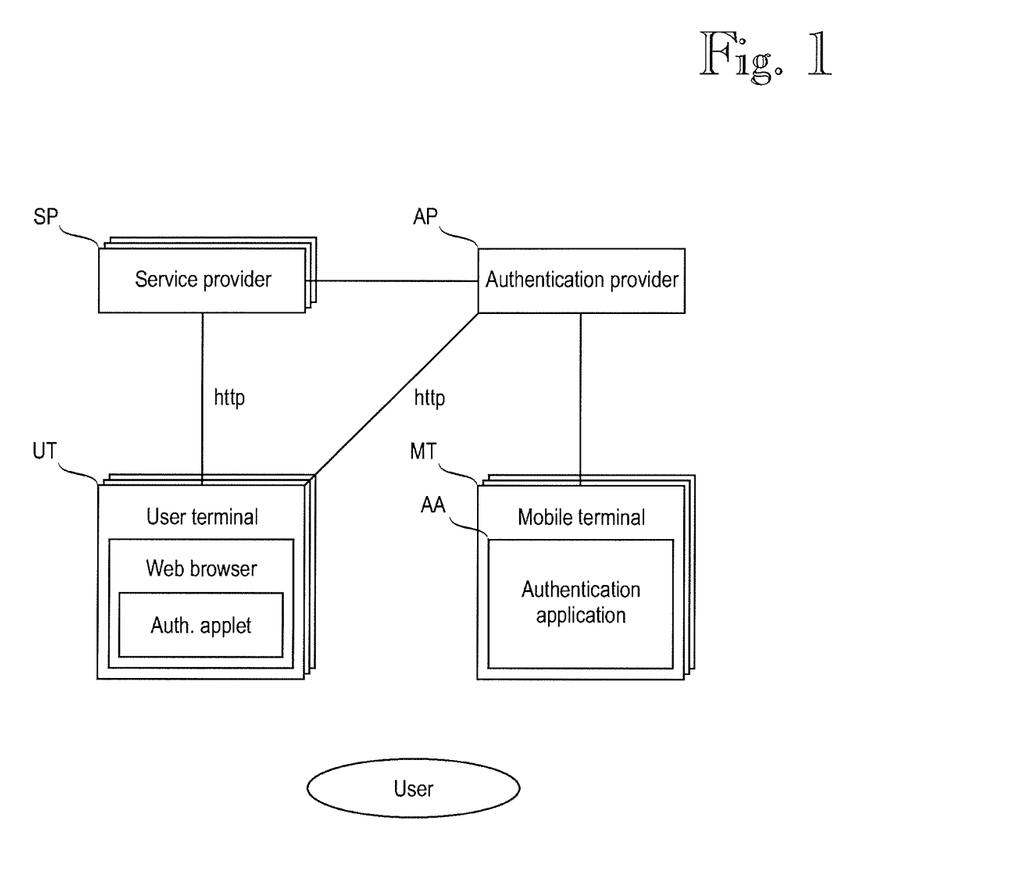
FIG. 1 schematically shows network elements and nodes for implementing the present invention.

FIG. 1 schematically shows network elements and nodes for implementing the present invention. A user uses a user terminal UT to access services of a service provider SP. In the present context, the service provider SP refers to a server or network node operated by a service operator. The user terminal UT is any kind of a data processing device operable to execute a web browser. A non-exhaustive list of applicable data processing devices includes desktop and laptop computers, tablet devices and smart telephones. The present, non-restrictive example relates to a case wherein, during actual service provisioning, the user terminal UT and service provider SP communicate by using conventional internet protocols or protocol suites, such as http, https and www. Those skilled in the art will realize that the invention is equally applicable to other protocol suites, such as CORBA.

In traditional service provisioning, each service provider SP authenticates each user terminal UT separately. Such authentication can be based on the traditional username/password combination, which involves several security problems, as is well known in the art. Data security can be improved by using one-time passwords, as is disclosed in the above-identified U.S. Pat. No. 7,613,919. That technology causes the residual problems identified in the background section of this document. The residual problems are solved, or at least alleviated, by using a centralized authentication provider AP, which is configured to authenticate the user terminal UT of a user by communicating with an authentication application installed in a mobile terminal MT associated with that user. As stated earlier, the user terminal UT and mobile terminal MT can be separate devices or two functionalities provided by a single piece of equipment, such as a smart telephone. For the purposes of the present invention, the user terminal UT is used for accessing services of the service provider, while the mobile terminal MT is needed for authenticating a user of the user terminal and mobile terminal. Those skilled in the art will realize that both functionalities may be provided by modern smart telephones, for example.

In a typical scenario, there's a one-to-one relation between users and mobile terminals on one hand and between users and user terminals on the other hand. In other words, each user uses at least one mobile terminal, and in a normal case, exactly one. Similarly, each user uses at least one user terminal, and in a normal case, exactly one. There is many-to-many relation between service providers and user terminals. This means that each user terminal may access, and typically does, services from several service providers, while each service provider provides services to several user terminals. On the other hand, the authentication provider has one-to-many relations to the mobile terminals on one hand and to the service providers on the other hand. This means that one authentication provider can service authentication requests from several mobile terminals and authenticate their users and associated user terminals to several service providers. This means that the inventive technique can be used to concentrate authentication tasks into a centralized authentication provider capable of servicing multiple users and multiple service providers.

Figure 2:
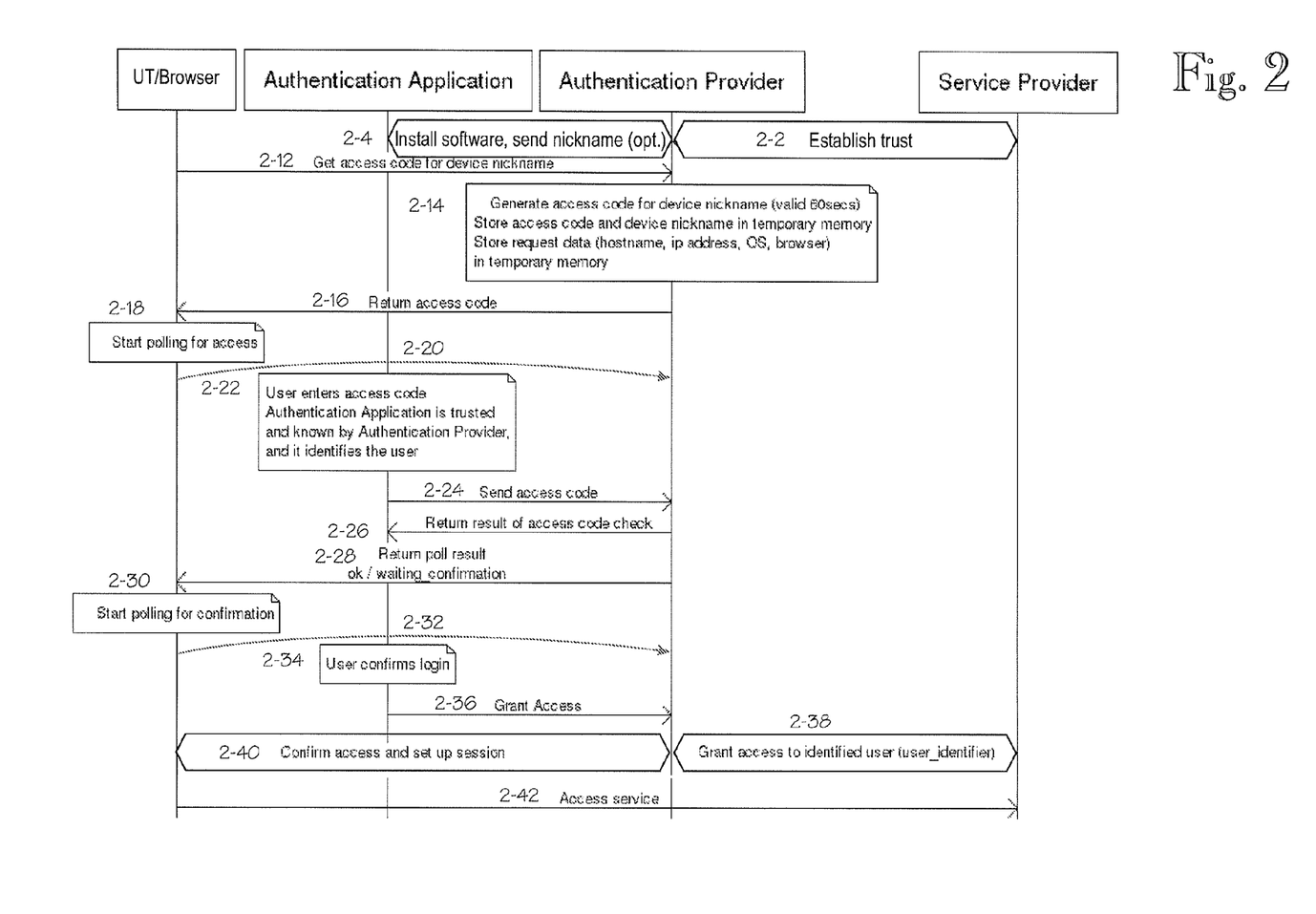
FIG. 2 illustrates an authentication procedure in the environment shown in FIG. 1.

FIG. 2 illustrates an authentication procedure in the environment shown in FIG. 1. A majority of the acts shown in FIG. 2 relate to session establishment between a user terminal UT and service provider SP, although the first two steps 2-2 and 2-4 are configuration steps which will remain effective over several sessions. In step 2-2 a trust relationship is established between the service provider SP and the authentication provider AP. The trust relationship can be based on static trust, where the authentication provider AP is deployed in the same infrastructure as the service provider SP, or the authentication provider is otherwise controlled by the service provider. Alternatively, the trust relationship can be a dynamic one, such that the service provider SP and authentication provider AP exchange a shared secret or mutually authenticate each other by means of certificates. By way of example, U.S. Pat. Nos. 4,200,770, 5,375,169, and 5,583,939 disclose applicable techniques for exchanging a shared secret for the purpose of establishing trust. The objective is to have a trust relationship between the service provider SP and the authentication provider AP, such that the service provider SP will be able to rely on information sent by the authentication provider AP. The information sent by the authentication provider AP to the service provider may include identification information, such as a user identifier, for identifying the user terminal UT and/or its user.

In step 2-4 an authentication application AA is installed in the mobile terminal MT. In other use cases the authentication application AA may be preinstalled in the mobile terminal MT, in which case only a client-side provisioning with appropriate parameters is performed. Similarly to the trust establishment between the service provider SP and authentication provider AP, a trust relationship is established between the authentication application AA of the mobile terminal MT and the authentication provider AP. According to an optional feature of the invention, the installation of the authentication application AA in the mobile terminal MT includes sending a device nickname of the mobile terminal MT to the authentication provider AP. Use of the device nickname reduces the vulnerability of the system to hacking and phishing, as will described later.

After the preparatory steps 2-2 and 2-4, step 2-12 begins a set of session-specific steps. In step 2-12, the browser applet in the user terminal UT sends an access code request to the authentication provider. The access code request includes data for identifying the user terminal UT. For example, the access code request may contain one or more of the following: host name, IP address, operating system, browser name and version. According to an optional feature of the invention, the access code request also contains the nickname assigned to the mobile terminal MT. The nickname does not have to be globally unique, but coupling the requested access code to a nickname assigned by the user increases data security because the access code is only valid for the specified nickname. In step 2-14 the authentication provider performs several internal tasks. First, it generates the requested access code. According to an optional feature of the invention, the access code is tied to the nickname assigned to the authentication application AA of the mobile terminal MT. According to another optional feature of the invention, the access code has a very limited lifetime, not much longer than what the human user needs to read the access code from the user interface UI1 of the user terminal and to enter it via the user interface UI2 of the mobile device, plus some processing delays. The lifetime for the access code may be set to one minute, for example. Second, the authentication provider stores the generated access code, the device nickname (if used) and the association between these elements in a temporary storage. Third, the authentication provider stores details of the access code request, such as the user terminal's IP address, browser name and version, operating system, host name, or the like.

In step 2-16 the authentication provider returns the access code that the browser applet requested in step 2-12. In step 2-18 the authentication applet starts a polling loop in which it periodically polls the authentication provider for results of an access code check. Reference numeral 2-20 indicates one example of such polling messages, but the user terminal UT repeatedly sends such polling messages until it receives a result from the authentication provider AP.

In one implementation of the invention it is assumed that the human user reads the access code from the user interface of the user terminal and enters it via the user interface of the mobile device. In step 2-22 the authentication application AA being executed on the mobile terminal MT detects the access code. The authentication application AA, which is trusted by the authentication provider AP, identifies the user. In some implementations of the invention, any user entitled to use the mobile device is considered identified. Other embodiments may implement more ambitious user identification schemes, such as requesting the user to enter the mobile terminal's PIN code, for example.

In step 2-24 the authentication application AA sends the access code to the authentication provider AP. In step 2-26 the authentication provider AP returns a result (success or failure) of the access code check to the authentication application AA. In case of success the authentication provider AP can also return information concerning the user terminal UT that requested the access code. The authentication application can show this information to the user, so as to give the user more assurance that the login process is with the user's own user terminal UT. In step 2-28 the authentication provider returns a polling result to the browser applet in the user terminal. In step 2-30 the authentication applet AA starts a polling loop in which it periodically polls the authentication provider AP for confirmation of granted access. Reference numeral 2-32 indicates one example of such polling messages, but the user terminal UT repeatedly sends such polling messages until it receives a confirmation from the authentication provider AP.

In step 2-34 the authentication application AA receives a login confirmation from the user, and in step 2-36 it sends a grant access message to the authentication provider AP, thus informing the authentication provider AP that the user terminal should be granted access.

At this point the user terminal UT is authenticated by an entity trusted by the service provider SP, namely the authentication provider AP. The authentication provider AP trusts the authentication provided by the mobile terminal MT (and by a mobile network operator). Because the authentication provider AP receives the access code from the authenticated mobile terminal MT shortly after sending the access code to the user terminal UT (in this example over the internet), the authentication provider AP has effectively authenticated the user of the user terminal UT. From this point on, process is relatively simple in the sense that all parties can trust each other and no further authentication acts need be performed. Accordingly, the following acts can be performed in any of several ways known in the art, and such acts need not be described in great detail. For the purposes of the present invention, it suffices to say that in step 2-38 the authentication provider AP sends a grant access message to the actual service provider SP. In step 2-40 the authentication provider AP confirms the access to the user terminal UT and sets up a session for it. Finally, in step 2-42 the user terminal UT accesses the service offered by the service provider SP.

It was stated in connection with step 2-14 that the authentication provider AP stores the generated access code and the associated identification parameters in a temporary storage. In the present context, temporary storage means that any long-term storage is not necessary. For example, the temporary storage may be implemented by using a FIFO (first in, first out) buffer, such that the memory used by the oldest contents will be reused by the newest content. Alternatively, the temporary storage may be implemented by periodically purging the storage from content whose age exceeds some threshold value. The threshold value for purging old content can be quite small, in view of the fact that the contents of the temporary storage need be kept in memory only for a time sufficient to complete the user terminal's authentication. One minute is normally quite sufficient.

As stated above, an optional feature of the invention involves restricting the access code to the nickname of the mobile terminal MT. This optional feature reduces the system's vulnerability to hacking and phishing attempts because the access code generated by the authentication provider AP is only effective if entered from a mobile terminal that the nickname has been assigned to. The nickname need not be globally unique, however.

FIGS. 1 and 2 and their associated descriptions relate to an ambitious implementation in which a centralized authentication provider AP is configured to serve several service providers SP, and a trust relationship between the authentication provider AP and the several service providers SP is established by cryptographic means, such as by using certificates or trusted secrets. Naturally it is possible to implement the invention in less ambitious manner, such that each of several operators implement the service providers SP and authentication providers AP in a commonly administered infrastructure, such as a subnetwork, in which case the trust relationship between the authentication provider AP and the service providers SP is implicit.

It was stated above, in connection with step 2-22, that the access code may be manually transferred from the user terminal UT to the authentication application AA. In a more ambitious implementation, the user terminal UT may convey the access code to the authentication application AA automatically, by using a short-range connection, such as Bluetooth, NFC (Near Field Communication), WLAN, infrared communications, or the like.

Figure 3:
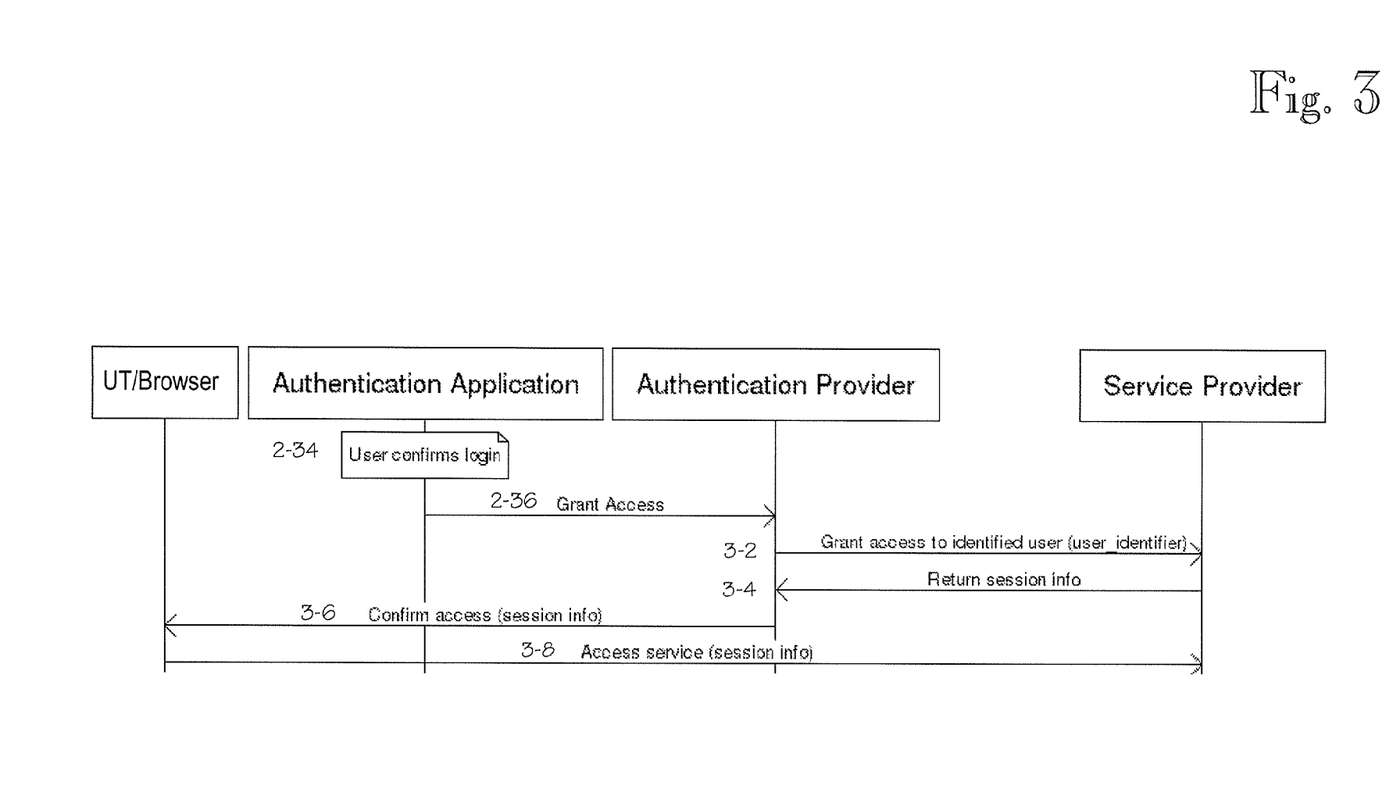
FIGS. 3 through 5 describe various ways for implementing acts performed after authentication, such as access grant, session establishment and service accessing.
Figure 4:
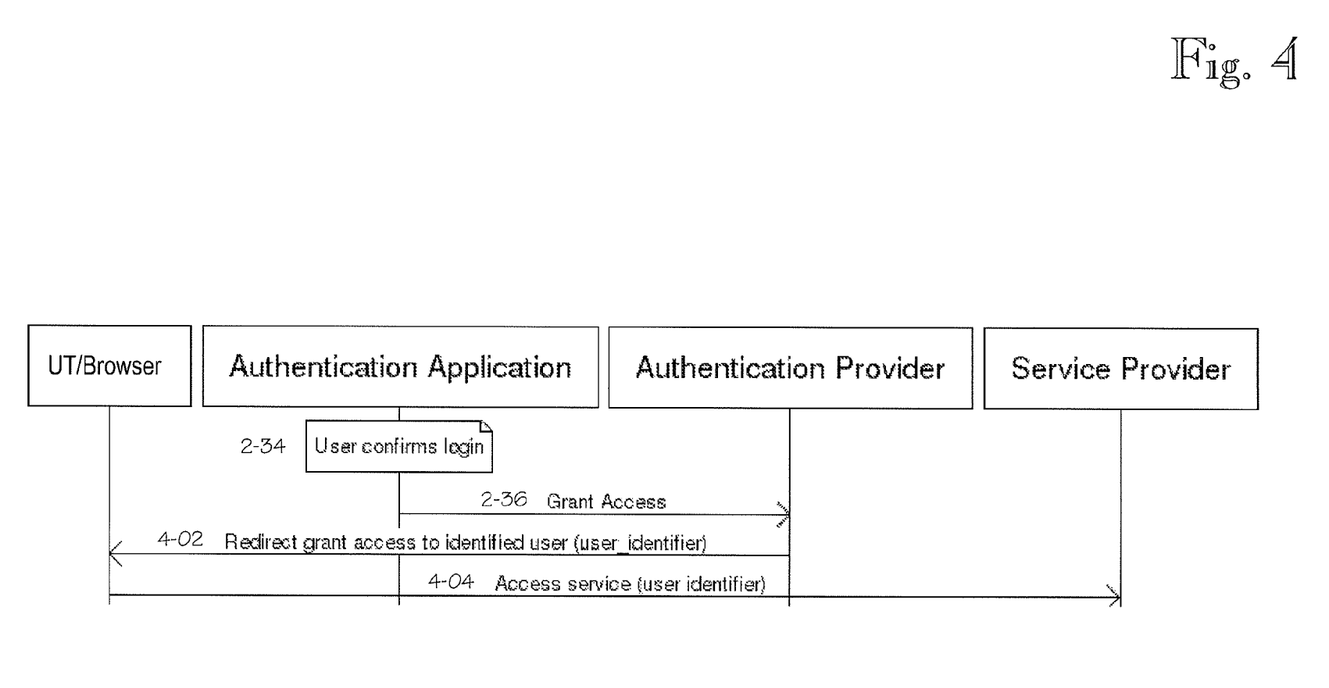
Figure 5:
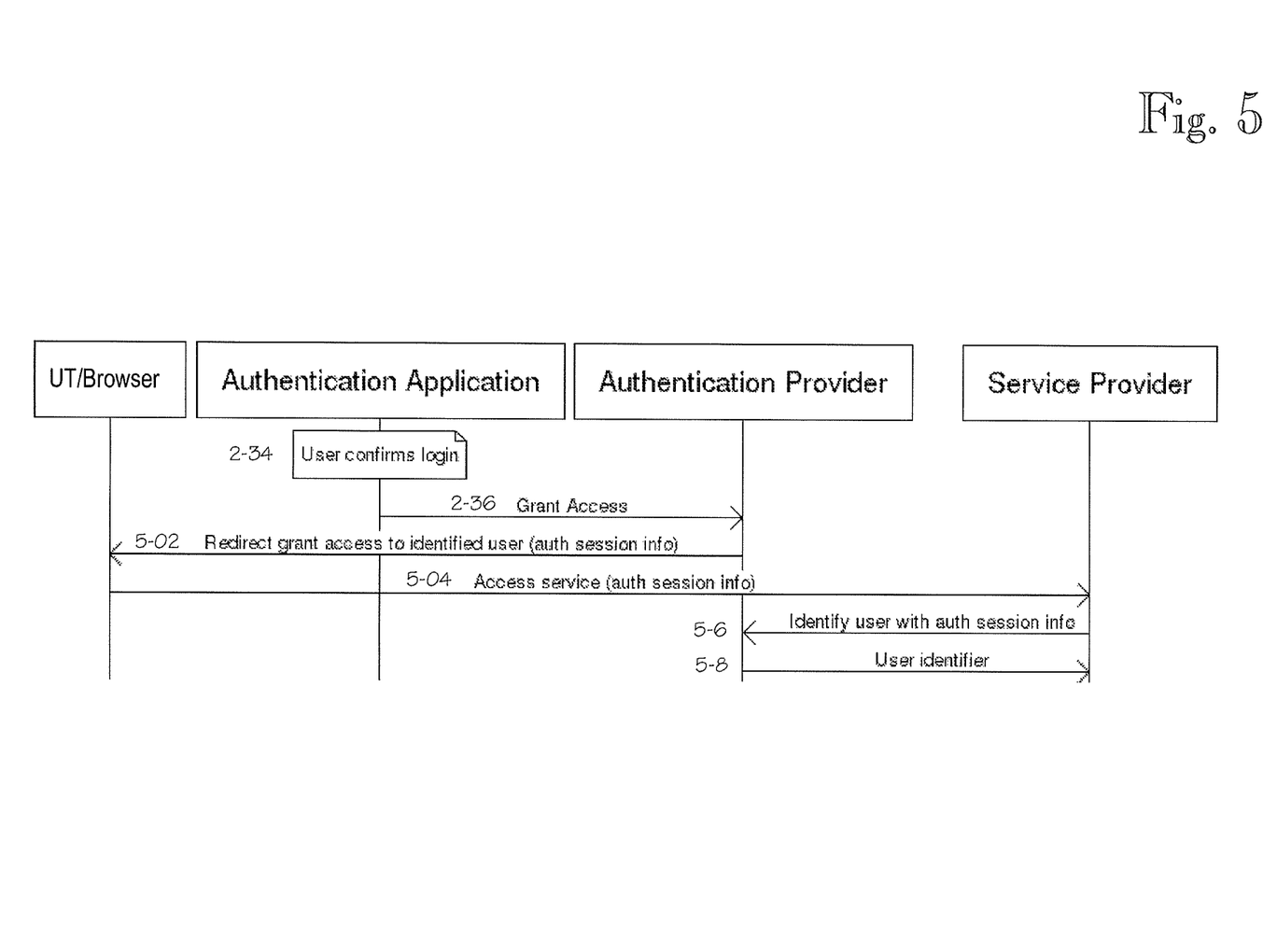

FIGS. 3 through 5 describe three different various ways for implementing acts performed after authentication, such as access grant, session establishment and service accessing. These acts are schematically shown as steps 2-38 through 2-42 in FIG. 2. Each of the alternative procedures shown in FIGS. 3 through 5 begins with steps 2-34 and 2-36, which have been described in connection with FIG. 2.

In step 3-2 the authentication provider AP sends the service provider SP an instruction to grant access to the user terminal UT. The instruction to grant access identifies the user terminal UT or its user. In step 3-4 the service provider SP returns session information to the authentication provider AP. In step 3-6 the authentication provider AP sends an access confirmation message, including the session information, to the user terminal UT. In step 3-8 the user terminal UT utilizes the session information to access services from the service provider SP.

FIG. 4 shows a procedure for granting access, which is based in redirection. In step 4-2 the authentication provider AP sends the user terminal UT a redirect message for granting access to the user terminal UT or its user. The redirect message contains a user identifier for identifying the user terminal UT or its user. In step 4-4 the user terminal UT utilizes the user identifier to access services from the service provider SP.

FIG. 5 shows a different access grant procedure, which is also based in redirection. In step 5-2 the authentication provider AP sends the user terminal UT a redirect message for granting access to the user terminal UT or its user. The redirect message, which contains information on an authenticated session between the user terminal UT and the service provider SP, instructs the user terminal UT to request services from the service provider SP. Accordingly, in step 5-4 the user terminal UT utilizes the information on the authenticated session to access services from the service provider SP. In step 5-6 the service provider SP requests the authentication provider AP to identify the user or user terminal that is utilizing the information on the authenticated session. In step 5-8 the authentication provider AP returns the user identifier to the service provider SP.

Figure 6:
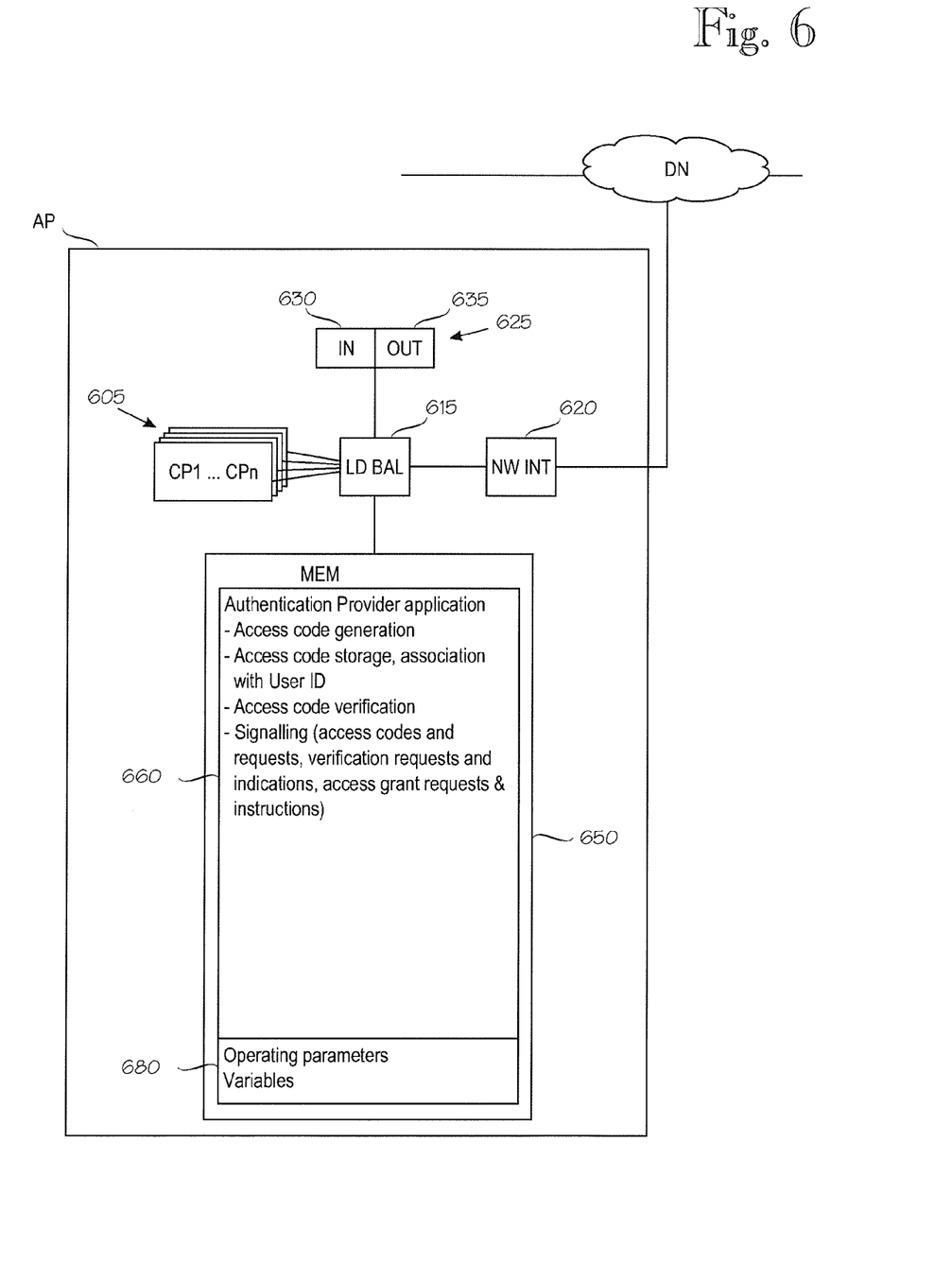
FIG. 6 schematically shows a block diagram of an apparatus specifically adapted to implement the present invention.

FIG. 6 schematically shows a block diagram of an authentication server computer which, in the context of the present invention, is called an Authentication provider AP. The server computer for the authentication provider AP comprises one or more central processing units CP1 . . . CPn, generally denoted by reference numeral 605. Embodiments comprising multiple processing units 605 are preferably provided with a load balancing unit 610 that balances processing load among the multiple processing units 605. The multiple processing units CP1 . . . CPn may be implemented as separate processor components or as physical processor cores or virtual processors within a single component case. The authentication provider AP also comprises a network interface 620 for communicating with data networks DN, such as the internet.

The authentication provider AP also comprises or utilizes external input-output circuitry 625 which constitutes a user interface of the authentication provider and comprises an input circuitry 630 and an output circuitry 635. The nature of the user interface depends on which kind of computer is used to implement the authentication provider AP. If the authentication provider AP is a dedicated computer, it may not need a local user interface, such as a keyboard and display, and the user interface may be a remote interface, in which case the authentication provider AP is managed remotely, such as from a web browser over the internet, for example. Such remote management may be accomplished via the same network interface 620 that the authentication provider utilizes for traffic between itself and the user terminals, mobile devices and service providers, or a separate management interface may be utilized. In addition, the user interface may be utilized for obtaining traffic statistics.

The server computer for the authentication provider AP also comprises memory 650 for storing program instructions, operating parameters and variables. Reference numeral 660 denotes a program suite for the authentication provider AP. The program suite 660 comprises program code for instructing the processor to execute the following functions:

Trust establishment and management between the authentication provider AP and the one or more service providers SP. This function may be implemented by exchanging shared secrets and/or PKI certificates between the authentication provider AP and the service provider(s) SP.

Trust establishment and management between the authentication provider AP and the authentication applications AA installed or provisioned in the mobile terminals MT.

Access code generation and storage.

Access code verification.

Signalling functions for 1) receiving access code requests from the user terminals, 2) sending access codes to the user terminals, 3) receiving access codes from authentication applications in the mobile terminals, 4) sending indications of verified access codes to the authentication applications in the mobile terminals, 5) receiving access grant requests from the authentication applications in the mobile terminals, 6) instructing service provider computers to grant access to the user terminals, and 7) sending a confirmation of the granted access to the user terminals.

Reference numeral 680 denotes an area of the memory 650 used to store parameters and variables. The memory area 680 is used for long-term storage of the shared secrets and/or certificates. In addition the memory area 680 is used for short-term storage of the pending access code requests, generated access codes, associations between access codes and user identifiers, and so on.

The above description of the specific embodiments is illustrative rather than restrictive. It is apparent to those skilled in the art that the invention can be implemented in various embodiments without departing from the scope of the attached claims. For instance, FIG. 2 depicts an implementation in which the user terminal and its browser utilize polling loops (initiated at steps 2-18 and 2-30) for obtaining information from the authentication provider. The invention is not restricted by these examples, however, and the authentication provider AP can equally well send push notifications to the user terminal, for the purpose of informing the latter on the access code verification and login confirmation made via the authentication application. Likewise, the illustrated examples use current internet protocols, but the present invention is equally applicable to other protocol suites, such as CORBA.

The invention claimed is:

1. A method, comprising:
  establishing a first trust relationship between an authentication provider and at least one service provider; and
  establishing a second trust relationship between the authentication provider and at least one authentication application installed in a first user terminal;
  the method further comprising the following steps for each authenticated session between a second user terminal and the at least one service provider, wherein the steps are performed by an authentication provider distinct from the at least one service provider and the at least one authentication application:

receiving a request for an access code from the second user terminal, along with connection information of the second user terminal;

generating the requested access code and storing the generated access code and the connection information of the second user terminal;

sending the generated access code to the second user terminal;

receiving the access code from the authentication application with which the authentication provider has the second trust relationship and which is installed in the first user terminal, wherein the first user terminal is distinct from the second user terminal to which the authentication provider generated and sent the access code;

indicating a positive verification of the access code to the authentication application installed in the first user terminal and to the second user terminal;

receiving, from the authentication application, a request to grant access to the second user terminal;

instructing the service provider to grant the requested access to the second user terminal; and sending a confirmation of the granted access to the second user terminal;

wherein an authenticated session between the second user terminal and the at least one service provider can be set up for providing the set of services to the second user terminal.

2. The method of claim 1, further comprising:
the authentication provider receiving a nickname for the authentication application installed in the first user terminal;
the authentication provider receiving the nickname in the request for an access code from the second user terminal; and
the authentication provider accepting the access code from the authentication application only if the access code is received from the authentication application to which the nickname has been assigned.

3. The method of claim 1, wherein said establishing the first trust relationship comprises mutual authentication by means of one or more public key infrastructure certificates.

4. The method of claim 1, wherein said establishing the second trust relationship comprises provisioning a public key infrastructure certificate from the authentication provider to the authentication application.

5. The method of claim 1, wherein said establishing the second trust relationship comprises using a shared secret key and authentication application private key.

6. The method of claim 1, wherein said instructing the service provider to grant the requested access comprises directly contacting the service provider from the authentication provider and passing an identification of the second user terminal or a user of the second user terminal.

7. The method of claim 1, wherein said instructing the service provider to grant the requested access comprises indirectly passing service grant information from the authentication provider via the second user terminal to the service provider, wherein the service grant information identifies the second user terminal or a session established for the second user terminal.

8. The method of claim 1, wherein the step of sending a confirmation of the granted access to the second user terminal comprises sending a session cookie or token to the second user terminal from the authentication provider or the service provider.

9. The method of claim 1, wherein the authentication provider distinct from the at least one service provider performs the steps recited in claim 2 in respect of multiple service providers for each of multiple user terminals.

10. A method, comprising:
establishing a first trust relationship between an authentication provider and at least one service provider; and
establishing a second trust relationship between the authentication provider and at least one authentication application installed in a first function of a user terminal;
the method further comprising the following steps for each authenticated session between a second function of the user terminal and the at least one service provider, wherein the steps are performed by an authentication provider distinct from the at least one service provider and the at least one authentication application:

receiving a request for an access code from the second function of the user terminal, along with connection information of the second function of the user terminal;

generating the requested access code and storing the generated access code and the connection information of the second function of the user terminal;

sending the generated access code to the second function of the user terminal;

receiving the access code from the authentication application with which the authentication provider has the second trust relationship and which is comprised in the first function of the user terminal, wherein the first function of the user terminal is distinct from the second function of the user terminal to which the authentication provider generated and sent the access code;

indicating a positive verification of the access code to the authentication application comprised in the first user terminal and to the second function of the user terminal;

receiving, from the authentication application, a request to grant access to the second function of the user terminal;

instructing the service provider to grant the requested access to the second function of the user terminal; and sending a confirmation of the granted access to the second function of the user terminal;

wherein an authenticated session between the second function of the user terminal and the at least one service provider can be set up for providing the set of services to the second function of the user terminal.

11. The method of claim 10, further comprising:
the authentication provider receiving a nickname for the authentication application installed in the first function of the user terminal;
the authentication provider receiving the nickname in the request for an access code from the second function of the user terminal; and
the authentication provider accepting the access code from the authentication application only if the access code is received from the authentication application to which the nickname has been assigned.

12. The method of claim 10, wherein said establishing the first trust relationship comprises mutual authentication by means of one or more public key infrastructure certificates.

13. The method of claim 10, wherein said establishing the second trust relationship comprises provisioning a public key infrastructure certificate from the authentication provider to the authentication application.

14. The method of claim 10, wherein said establishing the second trust relationship comprises using a shared secret key and authentication application private key.

15. The method of claim 10, wherein said instructing the service provider to grant the requested access comprises directly contacting the service provider from the authentication provider and passing an identification of the second function of the user terminal or a user of the second function of the user terminal.

16. The method of claim 10, wherein said instructing the service provider to grant the requested access comprises indirectly passing service grant information from the authentication provider via the second function of the user terminal to the service provider, wherein the service grant information identifies the second function of the user terminal or a session established for the second function of the user terminal.

17. The method of claim 10, wherein the step of sending a confirmation of the granted access to the user terminal comprises sending a session cookie or token to the user terminal from the authentication provider or the service provider.

18. The method of claim 10, wherein the authentication provider distinct from the at least one service provider performs the steps recited in claim 11 in respect of multiple service providers for each of multiple user terminals.

19. A processor, wherein the processor is configured to perform as an authentication provider for at least one service provider with which the authentication provider has a first trust relationship, and for at least one first user terminal having an authentication application installed therein, with which the authentication provider has a second trust relationship;
the processor comprising:
at least one processing unit and memory for storing applications and data;
wherein the memory comprises program code instructions for instructing the at least one processing unit to carry out the following steps when the program code instructions are executed in the at least one processing unit;
receiving a request for an access code from the second user terminal, along with connection information of the second user terminal;
generating the requested access code and storing the generated access code and the connection information of the second user terminal;
sending the generated access code to the second user terminal;
receiving the access code from the authentication application with which the authentication provider has the second trust relationship and which is installed in the first user terminal, wherein the first user terminal is distinct from the second user terminal to which the authentication provider generated and sent the access code;
indicating a positive verification of the access code to the authentication application installed in the first user terminal and to the second user terminal;
receiving, from the authentication application, a request to grant access to the second user terminal;
instructing the service provider to grant the requested access to the second user terminal; and
sending a confirmation of the granted access to the second user terminal;
wherein an authenticated session between the second user terminal and the at least one service provider can be set up for providing the set of services to the second user terminal.

20. A processor, wherein the processor is configured to act perform as an authentication provider for at least one service provider with which the authentication provider has a first trust relationship, and for at least one user terminal having an authentication application installed in a first function of the user terminal, with which the authentication provider has a second trust relationship;
the processor comprising:
at least one processing unit and memory for storing applications and data;
wherein the memory comprises program code instructions for instructing the at least one processing unit to carry the following steps when the program code instructions are executed in the at least one processing unit:
receiving a request for an access code from the second function of the user terminal, along with connection information of the second function of the user terminal;
generating the requested access code and storing the generated access code and the connection information of the second function of the user terminal;
sending the generated access code to the second function of the user terminal;
receiving the access code from the authentication application with which the authentication provider has the second trust relationship and which is comprised in the first function of the user terminal, wherein the first function of the user terminal is distinct from the second function of the user terminal to which the authentication provider generated and sent the access code;
indicating a positive verification of the access code to the authentication application comprised in the first function of the user terminal and to the second function of the user terminal;
receiving, from the authentication application, a request to grant access to the second function of the user terminal;
instructing the service provider to grant the requested access to the second function of the user terminal; and
sending a confirmation of the granted access to the second function of the user terminal;
wherein an authenticated session between the second function of the user terminal and the at least one service provider can be set up for providing the set of services to the second function of the user terminal.

21. The method of claim 2, wherein said establishing the first trust relationship comprises exchanging a shared cryptographic secret.

22. The processor of claim 19, wherein the memory further comprises program code instructions for instructing the at least one processing unit to carry out the following steps when the program code instructions are executed in the at least one processing unit:
receiving a nickname for the authentication application installed in the first user terminal;
receiving the nickname in the request for an access code from the second function of the user terminal; and
accepting the access code from the authentication application only if the access code is received from the authentication application to which the nickname has been assigned.

23. The processor of claim 19, wherein the memory further comprises program code instructions for instructing the at least one processing unit to establish the first trust relationship by exchanging a shared cryptographic secret.

24. The processor of claim 19, wherein the memory further comprises program code instructions for instructing the at least one processing unit to establish the first trust relationship by mutual authentication using one or more public key infrastructure certificates.

25. The processor of claim 19, wherein the memory further comprises program code instructions for instructing the at least one processing unit to establish the second trust relationship by provisioning a public key infrastructure certificate from the authentication provider to the authentication application.

26. The processor of claim 19, wherein the memory further comprises program code instructions for instructing the at least one processing unit to establish the second trust relationship by using a shared secret key and authentication application private key.

27. The processor of claim 19, wherein the memory further comprises program code instructions for instructing the at least one processing unit to grant the requested access by directly contacting the service provider from the authentication provider and passing an identification of the second user terminal or a user of the second user terminal.

28. The processor of claim 19, wherein the memory further comprises program code instructions for instructing the at least one processing unit to instruct the service provider to grant the requested access by indirectly passing service grant information from the authentication provider via the user second terminal to the service provider, wherein the service grant information identifies the second user terminal or a session established for the second user terminal.

29. The processor of claim 19, wherein the memory further comprises program code instructions for instructing the at least one processing unit to send a confirmation of the granted access to the second user terminal by sending a session cookie or token to the second user terminal from the authentication provider or the service provider.

30. The processor of claim 19, wherein the processor is configured to perform as the authentication provider distinct from the at least one service provider in respect of multiple service providers for each of multiple user terminals.

31. The method of claim 11, wherein said establishing the first trust relationship comprises exchanging a shared cryptographic secret.

32. The processor of claim 20, wherein the memory further comprises program code instructions for instructing the at least one processing unit to carry out the following steps when the program code instructions are executed in the at least one processing unit:
receiving a nickname for the authentication application installed in the first function of the user terminal;
receiving the nickname in the request for an access code from the second function of the user terminal; and
accepting the access code from the authentication application only if the access code is received from the authentication application to which the nickname has been assigned.

33. The processor of claim 20, wherein the memory further comprises program code instructions for instructing the at least one processing unit to establish the first trust relationship by mutual authentication with one or more public key infrastructure certificates.

34. The processor of claim 20, wherein the memory further comprises program code instructions for instructing the at least one processing unit to establish the second trust relationship by provisioning a public key infrastructure certificate from the authentication provider to the authentication application.

35. The processor of claim 20, wherein the memory further comprises program code instructions for instructing the at least one processing unit to establish the second trust relationship by using a shared secret key and authentication application private key.

36. The processor of claim 20, wherein the memory further comprises program code instructions for instructing the at least one processing unit to grant the requested access by directly contacting the service provider from the authentication provider and passing an identification of the second function of the user terminal or a user of the second function of the user terminal.

37. The processor of claim 20, wherein the memory further comprises program code instructions for instructing the at least one processing unit to instruct the service provider to grant the requested access by indirectly passing service grant information from the authentication provider via the user second function of the terminal to the service provider, wherein the service grant information identifies the second function of the user terminal or a session established for the second function of the user terminal.

38. The processor of claim 20, wherein the memory further comprises program code instructions for instructing the at least one processing unit to send a confirmation of the granted access to the second function of the user terminal by sending a session cookie or token to the second function of the user terminal from the authentication provider or the service provider.

39. The processor of claim 20, wherein the processor is configured to perform as the authentication provider distinct from the at least one service provider in respect of multiple service providers for each of multiple user terminals.

* * * * *